United States Patent
Ibsies (10) Patent No.: US 10,612,289 B2
(45) Date of Patent: Apr. 7, 2020

(54) AUTOMATED DOOR

(71) Applicant: Fadi Ibsies, Tigard, OR (US)

(72) Inventor: Fadi Ibsies, Tigard, OR (US)

(73) Assignee: FADI IBSIES, Tigard, OR (US)

( * ) Notice: Subject to any disclaimer, the term of this patent is extended or adjusted under 35 U.S.C. 154(b) by 0 days.

(21) Appl. No.: 15/715,149

(22) Filed: Sep. 25, 2017

(65) Prior Publication Data

US 2018/0016836 A1   Jan. 18, 2018

Related U.S. Application Data

(63) Continuation-in-part of application No. 14/242,376, filed on Apr. 1, 2014, now Pat. No. 9,771,751, and a
(Continued)

(51) Int. Cl.
*E05B 41/00* (2006.01)
*E05F 15/74* (2015.01)
(Continued)

(52) U.S. Cl.
CPC .............. *E05F 15/74* (2015.01); *E05B 41/00* (2013.01); *E05B 47/02* (2013.01); *G07C 9/00896* (2013.01); *H04N 7/186* (2013.01); *H04N 7/188* (2013.01); *E05B 9/08* (2013.01); *E05B 47/0002* (2013.01); *E05B 47/0012* (2013.01); *E05B 2047/002* (2013.01); *E05B 2047/0026* (2013.01); *E05B 2047/0056* (2013.01); *E05B 2047/0086* (2013.01); *E05Y 2201/422* (2013.01); *E05Y 2400/822* (2013.01); *E05Y 2400/852* (2013.01); *E05Y 2400/86* (2013.01); *E05Y 2600/46* (2013.01); *E05Y 2900/112* (2013.01); *G07C 2209/62* (2013.01)

(58) Field of Classification Search
CPC .............................. H04N 7/186; H04N 7/188
See application file for complete search history.

(56) References Cited

U.S. PATENT DOCUMENTS

| | | |
|---|---|---|
| 4,763,937 A | 8/1988 | Sittnick, Jr. et al. |
| 5,855,027 A | 1/1999 | Macedo |
| | (Continued) | |

OTHER PUBLICATIONS

Choi, Eunjung; Kwon, Sunghyuk; Lee, Donghun; Lee, Hojin; and Chung, Min K., "Can User-Derived Gesture be Considered as the Best Gesture for a Command?: Focusing on the Commands for Smart Home System," Department of Industrial and Management Engineering, Pohang University of Science and Technology (POSTECH), South Korea, © 2012 by Human Factors and Ergonomics Society, Inc., 5 pages.

*Primary Examiner* — Jonathan R Messmore
(74) *Attorney, Agent, or Firm* — The Law Office of Karen Dana Oster, LLC (57) ABSTRACT

An automated door-opening device is disclosed that includes a first sensor disposed on the outside of the door. The first sensor is adapted to recognize a predetermined pattern of a gesture made by a patron. The gesture made in front of the first sensor opens the door by a first actuator. A second actuator can be used to lock or unlock the door, thereby providing full hand-free operation of the door. A hinge system is disclosed that includes three off-set hinges adapted to utilize the weight of the door to cause the door to self position and allow manual operation of the door.

13 Claims, 10 Drawing Sheets

Related U.S. Application Data continuation-in-part of application No. 13/846,002, filed on Mar. 18, 2013.

(51) Int. Cl.
    *E05B 47/02*     (2006.01)
    *H04N 7/18*     (2006.01)
    *G07C 9/00*     (2020.01)
    *E05B 47/00*     (2006.01)
    *E05B 9/08*     (2006.01)

(56) References Cited

U.S. PATENT DOCUMENTS

| | | | |
|---|---|---|---|
| 5,878,530 A | 3/1999 | Eccleston et al. | |
| 5,963,000 A | 10/1999 | Tsutsumi et al. | |
| 6,108,975 A | 8/2000 | Bailey | |
| 6,486,793 B1 | 11/2002 | Buccola | |
| 6,967,587 B2 | 11/2005 | Snell et al. | |
| 7,042,492 B2 | 5/2006 | Spinelli | |
| 7,068,179 B2 | 6/2006 | Snell et al. | |
| 7,234,201 B2 | 6/2007 | Brown et al. | |
| 7,805,810 B2 | 10/2010 | Hoffman | |
| 7,971,316 B2 | 7/2011 | Copeland, II et al. | |
| 8,141,296 B2 | 3/2012 | Bem | |
| 8,284,018 B2 | 10/2012 | Ibsies | |
| 8,390,219 B2 | 3/2013 | Houser | |
| 8,407,937 B2 | 4/2013 | Houser | |
| 9,771,751 B2 | 9/2017 | Ibsies | |
| 2002/0176607 A1 | 11/2002 | Bond et al. | |
| 2005/0073425 A1 | 4/2005 | Snell et al. | |
| 2007/0056084 A1 | 3/2007 | Watt et al. | |
| 2007/0241927 A1* | 10/2007 | Ratnakar | G06Q 10/02 340/4.6 |
| 2008/0222963 A1* | 9/2008 | Zwart | E05B 47/00 49/503 |
| 2008/0230554 A1 | 9/2008 | Randolph | |
| 2009/0000196 A1* | 1/2009 | Kollar | E05F 15/43 49/28 |
| 2009/0079813 A1 | 3/2009 | Hildreth | |
| 2011/0249107 A1 | 10/2011 | Chiu | |
| 2013/0169815 A1* | 7/2013 | Carney | H04L 63/0853 348/156 |
| 2014/0313154 A1* | 10/2014 | Bengtsson | H04B 13/005 345/174 |
| 2014/0345396 A1 | 11/2014 | Riedel | |
| 2015/0287254 A1 | 10/2015 | Ribas et al. | |
| 2016/0340956 A1 | 11/2016 | Ibsies | |

* cited by examiner

AUTOMATED DOOR

FIELD OF THE INVENTION

This invention relates to an apparatus and method of use for automatically opening, closing, locking, and unlocking a door and more specifically for hands-free operation of a door. This invention also relates to a hinge mechanism apparatus for automated doors and more specifically, to a hinge mechanism for hands-free operation of a door.

BACKGROUND OF THE INVENTION

Recently, many devices and systems have been introduced to automate and render "hands-free" various operating fixtures of public bathrooms. From simple foot operated garbage can lids to removal of entry doors, varied attempts to render public bathrooms hygienic and eliminate hand-contact with fixtures has been limited to on-off, start-stop, or open-close operations of traditional facilities.

One attempt to provide a hands-free door-opening apparatus, described by Snell et al. in U.S. Pat. No. 7,068,179 on Jun. 27, 2006, includes an apparatus for automatically opening a swinging restroom door. It comprises an actuator, a control unit, and a power assisted drive mechanism and proximity sensor. This apparatus is applied to an exit/entry door to a bathroom and is not adapted for use on a stall-door. A patron waves his or her hand within the detection zone of the proximity sensor, and this movement activates the door to open. Snell, however, does not contemplate adapting the apparatus for a stall-door, which typically is a much lighter door and lacks the physical space requirements for his apparatus. Further, not contemplated by Snell is the need for locking the enclosed area door when occupied by a patron and indicating to waiting patrons that the enclosed area is occupied.

Other attempts at hands-free operation of other bathroom fixtures include providing a sensor coupled to an activation mechanism whereby motion of a patron's hand within the proximity sensor's range causes towels to dispense from automated paper-towel dispensers, turns on a stream of water from a faucet, dollops a predetermined amount of soap from a soap dispenser, or begins a time cycle activation of a heated hand dryer, for example. Motion sensors are also used to automate toilette flushing.

The inventor of the invention disclosed herein previously improved automated doors with an Automated Bathroom-Stall Door as described in U.S. Pat. No. 8,284,018 (issued on Oct. 9, 2012 to Ibsies). This reference describes a method and device that successfully operates and locks "hands-free" an enclosed area door. However, upon further reflection this inventor realized that further improvements could be made to further reduce the power needed to open such an automated door by improving the hinge mechanism.

Yet, to date, no attempts have been made to successfully operate and lock "hands-free" an enclosed an enclosed area door. The traditional method of locking enclosed area doors still requires the patron to contact a lever and bolt the door, or turn a cam to lock the stall-door. Further, there have been no successful attempts to enable hands-free opening and closing of the stall-door. The enclosed area door presents problems and challenges not contemplated by any prior-art attempts to automate bathroom facilities functions.

BRIEF SUMMARY OF THE INVENTION

Because the enclosed area door presents problems and challenges not contemplated by any prior-art attempts to automate bathroom facilities functions, there remains a need for a device that can be fit to existing stall-doors or incorporated into new stall-doors that enables a patron to open and close the door hands-free and further to lock the door without contacting any surfaces. Further, such an improvement should also inform waiting patrons that the enclosed area is occupied. Such an improvement should further include low power-consumption mechanisms and be easy to operate. Yet still another need is an easy-to-use device that enables disabled patrons to operate the enclosed area door without using their hands for both opening/closing and locking/unlocking.

A hinge system is disclosed that includes three off-set hinges adapted to utilize the weight of the door to cause the door to self position and allow manual operation of the door. A center hinge includes a top leaf, a center pin, and a bottom leaf. The center pin includes an upper pin-portion adapted to slidably insert into a inverted slot on a top socket of the top leaf and an oppositely disposed lower pin-portion adapted to slidably insert into an upright cylindrical slot of the bottom leaf. A gear is disposed intermediate to the upper pin-portion and lower pin-portion. The gear is fixed or otherwise coupled to the pin whereby rotation of the gear results in corresponding rotation of the pin including both the top portion and bottom portion. The lower pin-portion further includes a beveled lower (distal) end. This bevel matches a corresponding bevel in the bottom leaf.

DETAILED DESCRIPTION OF THE INVENTION

Possible preferred embodiments will now be described with reference to the drawings and those skilled in the art will understand that alternative configurations and combinations of components may be substituted without subtracting from the invention. Also, in some figures certain components are omitted to more clearly illustrate the invention. The Automated Door Opening System.

Figure 20:
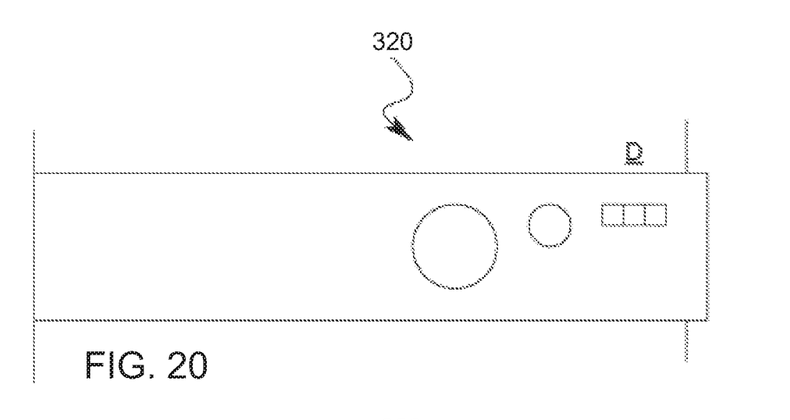
FIG. 20 shows a first face of hand-free operation module with proximity sensors and LED indicators.
Figure 21:
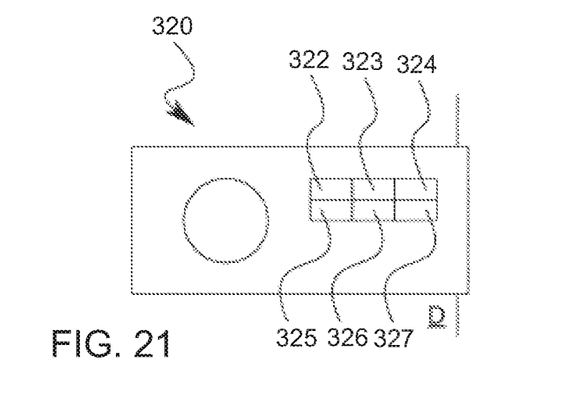
FIG. 21 shows a second face of a hands-free option module with proximity sensors and LED indicators.

As in U.S. Pat. No. 8,284,018, the present invention enables hands-free operation of a door from inside or outside and includes manual override from both sides. To prevent unintended opening of the stall-door the present invention includes at least one sensor to determine if the restroom enclosed area is occupied. This sensor, in some contemplated embodiments, is a proximity sensor 14 (FIG. 13) coupled to an image processor that is programmed to "see" whether space, such as a bathroom stall, or other enclosed area, is occupied. FIGS. 20 and 21 show a first face and a second face, respectively, of a hands-free operation module 320 with proximity sensors 322, 323, 324, and LED indicators 325, 326, and 327. The determination of whether an enclosed area is occupied is a first condition, which will be further discussed below.

Figure 1:
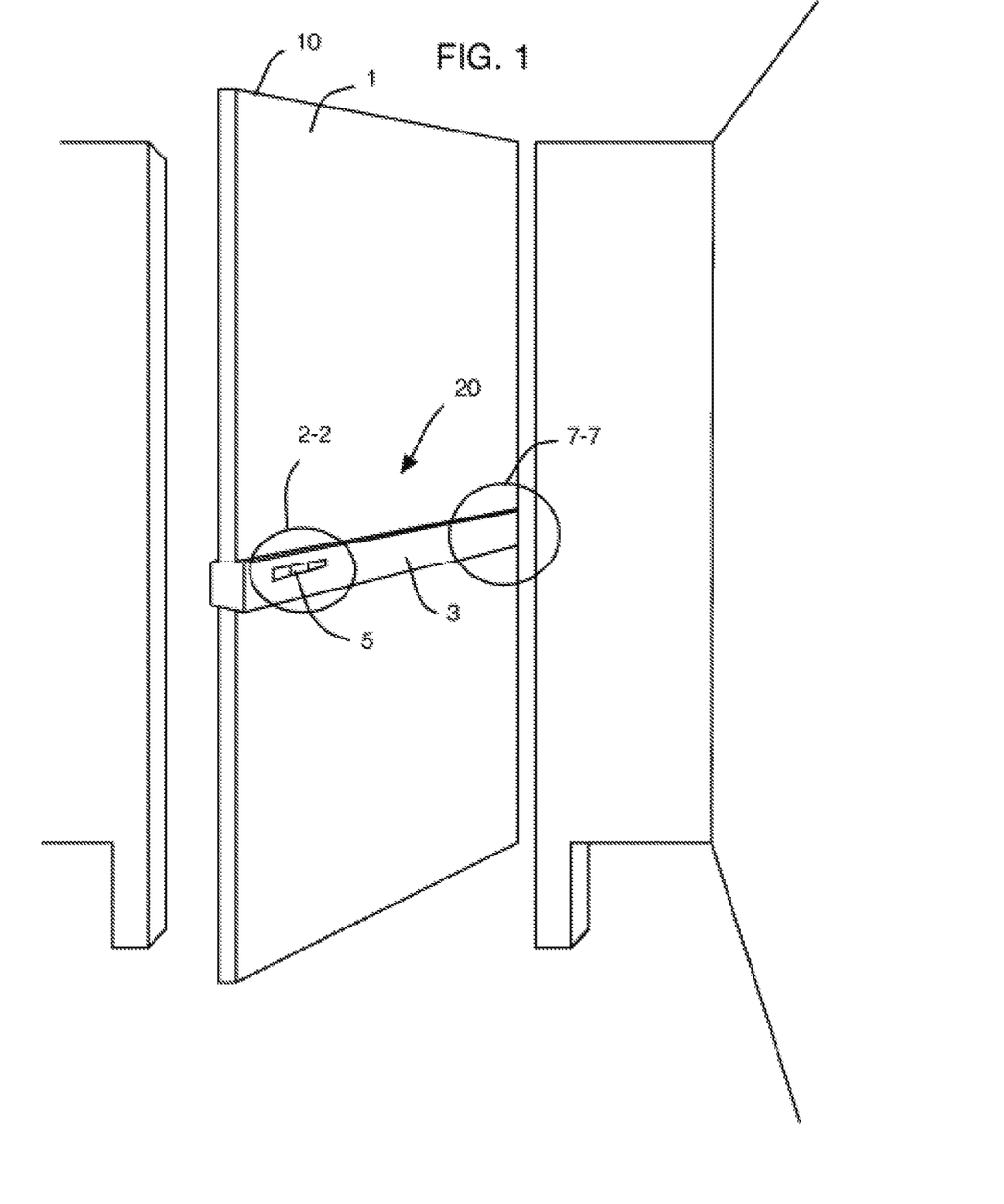
FIG. 1 illustrates a back view of a first preferred embodiment of the present invention in an environment of use.
Figure 8:
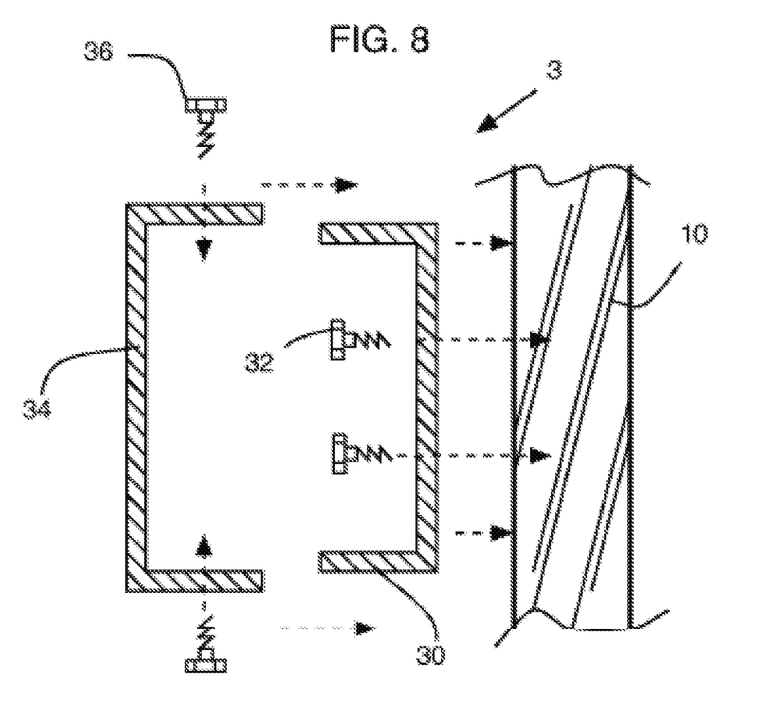
FIG. 8 is a side view of a possible mounting mechanism of the present invention.
Figure 9:
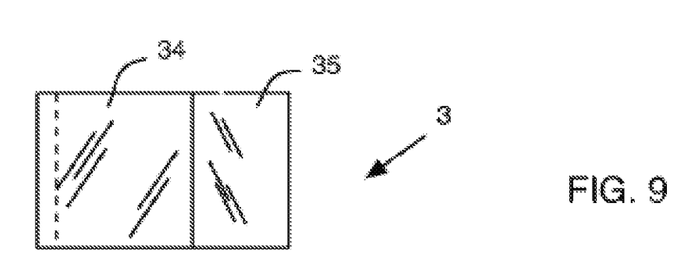
FIG. 9 is a front view of a possible housing or shell of the present invention showing a first amount of overlap of two portions of the shell.
Figure 10:
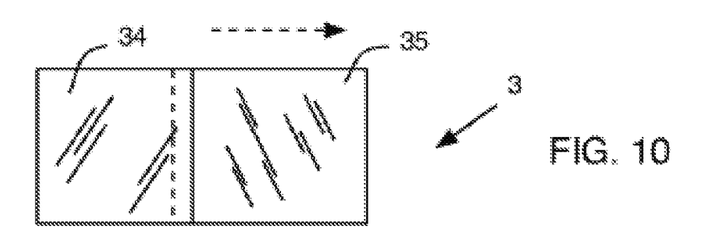
FIG. 10 is a second position of the embodiment of FIG. 9.

FIG. 1 illustrates an interior perspective of a portion of a conventional public restroom enclosed area including a door 10 having an interior surface 1. A preferred embodiment of the present invention includes a hands-free operation module 20 for the enclosed area door, of which a portion is mounted on the interior face 1 of the door 10. This interior portion of the module 20 includes a 20 housing 3, at least a portion of which is a rigid shell segment or a plurality of overlapping segments (for example segments 34 and 35 of FIGS. 9 and 10) to accommodate varying widths of enclosed area doors. The shell 3 includes a mounting plate 30 (see FIG. 8), which affixes to the enclosed area door in a conventional manner, such as sheet-metal screws 32 fastening the plate to the door. The plate, moreover, may include a flange or flanges extending from the mounting surface outward to provide a mating surface for mounting a portion of the exterior 34 of the shell to the enclosed area door via the flange and fasteners 36.

Relative to the interior face of the stall-door, the present invention 20 includes a shell disposed on a portion of the enclosed area door and extending at least partially, or preferably across the entire width of the enclosed area door. The shell 3 at a proximal end defined by the opening edge of the enclosed area door includes a sensor and display array (indicated generally by the encircled detail labeled 2 in FIG. 1), while the opposite, distal end of the shell includes a mechanism for opening and closing the door (indicated generally by the encircled 10 detail labeled 7-7 in FIG. 1).

Figure 3:
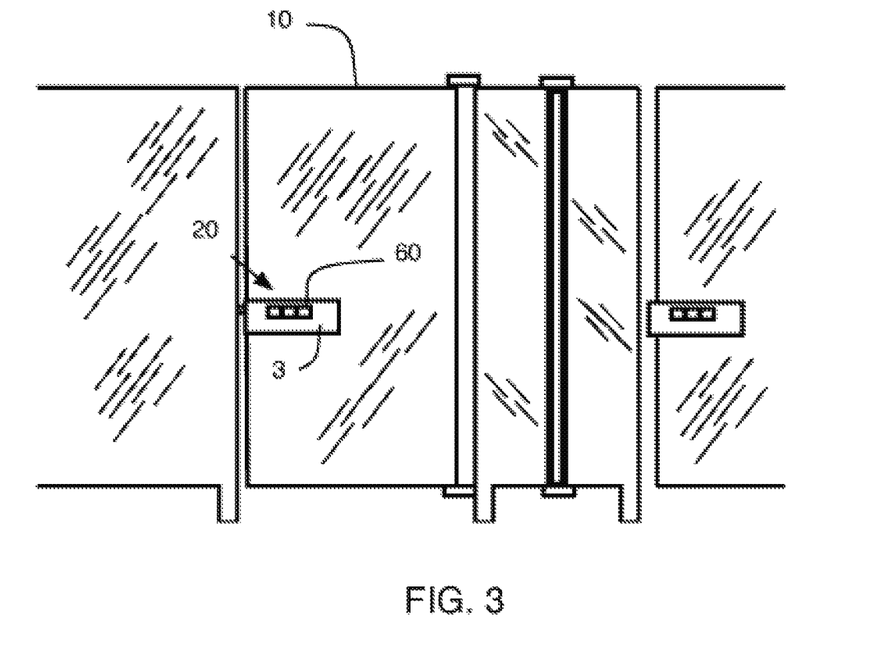
FIG. 3 is a front view of the first preferred embodiment of the present invention in an environment of use.
Figure 4:
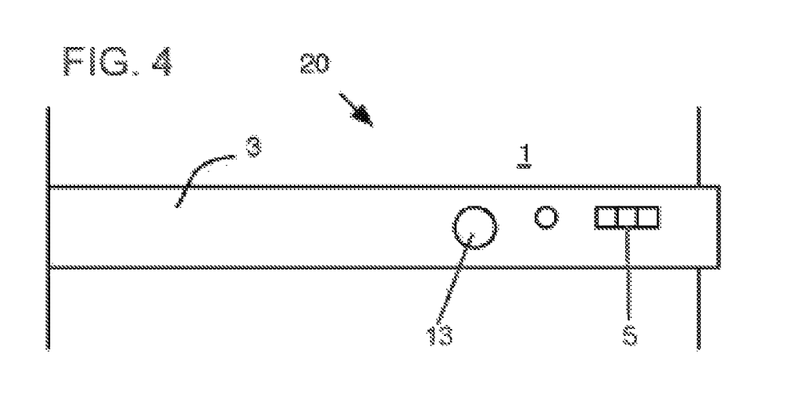
FIG. 4 is a front view of a second embodiment of the present invention.

FIG. 3 illustrates the exterior face 11 of the enclosed area door 10. On this side, the present invention 20 includes a shell 3 covering only a portion of the exterior of the enclosed area door, the portion being sufficient to present a sensor 14 and display 60 to patrons. FIG. 4, a top view of the present invention 20, illustrates an enclosed area door 11 with the shell 3 surrounding the door, a portion of which extends to the exterior face, and a portion of which extends along the interior face of the door and a connecting segment, or flat plat that plate that is wide enough to carry electrical communication signal wires from the interior portion of the shell to the exterior face, and yet slim enough to enable normal operation (opening/closing and locking/unlocking) of the enclosed area door.

Figure 2:
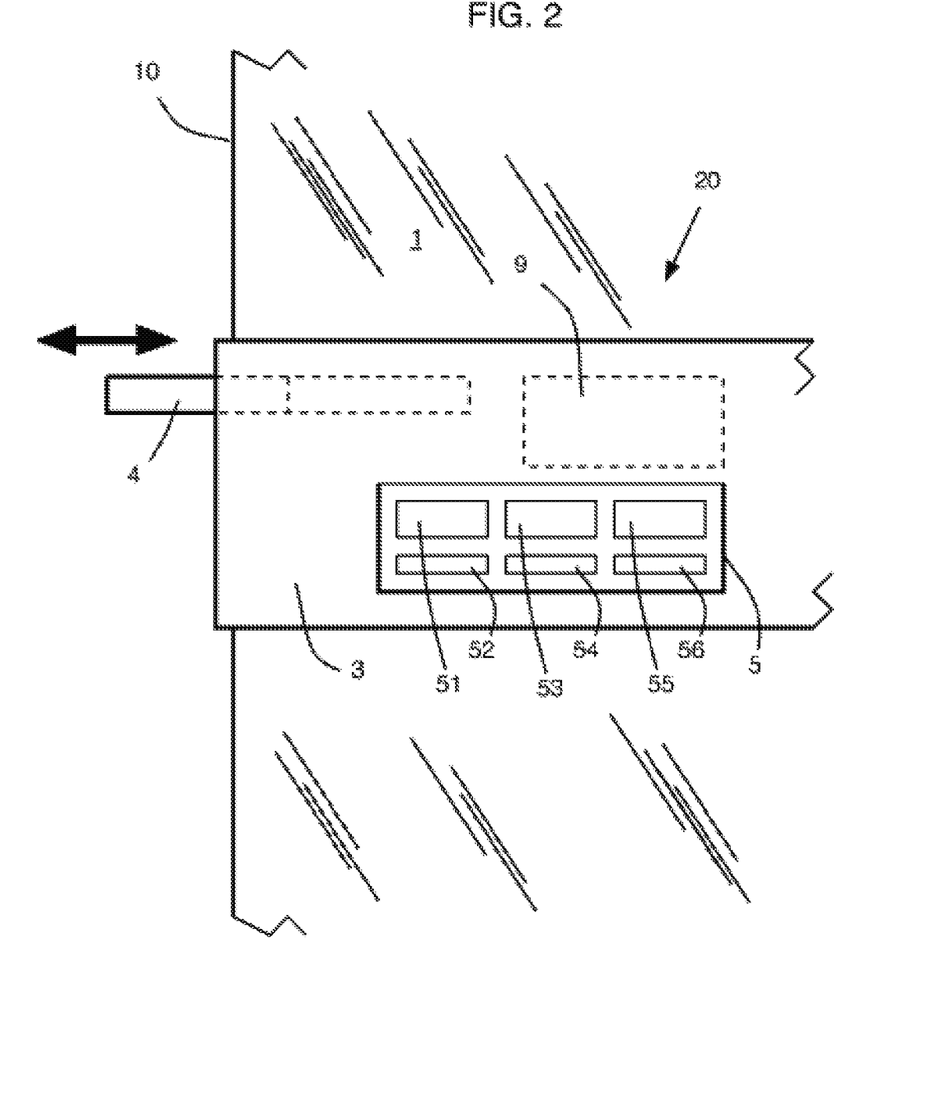
FIG. 2 is a detail view of section 2-2 of FIG. 1.

FIG. 2 shows a portion of the interior face 1 of the enclosed area door 10 and details a portion of the present invention 20 including the shell housing 3 having a display and sensor array 5. The housing further covers and holds therein a lock mechanism 4 and controller (or preferably a processor 9) with power supply (commonly referenced by the single reference numeral 9 in FIG. 2). This processor and power supply, naturally, can be two separate units, such as a solid-state logic board and separate battery pack coupled by electrical wires for transferring power to the board and further in electrical communication with the various components as would be understood by those skilled in this art.

Figure 11:
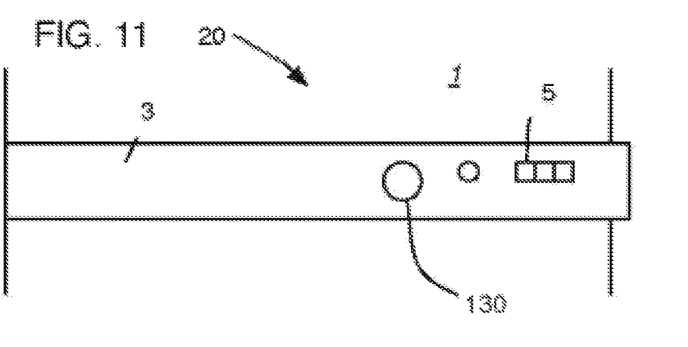
FIG. 11 is a front view of the housing of FIG. 9 and further shows the first camera.
Figure 12:
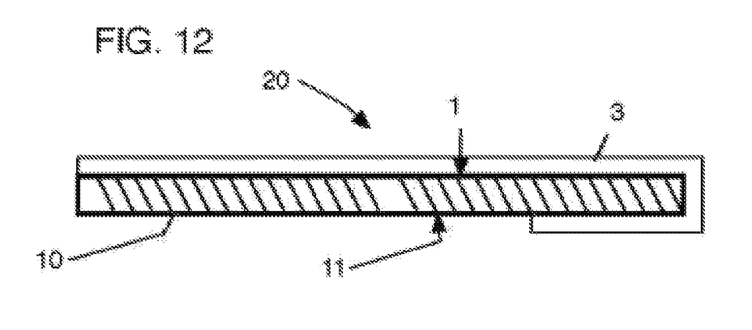
FIG. 12 is a top sectional view of FIG. 11.
Figure 13:
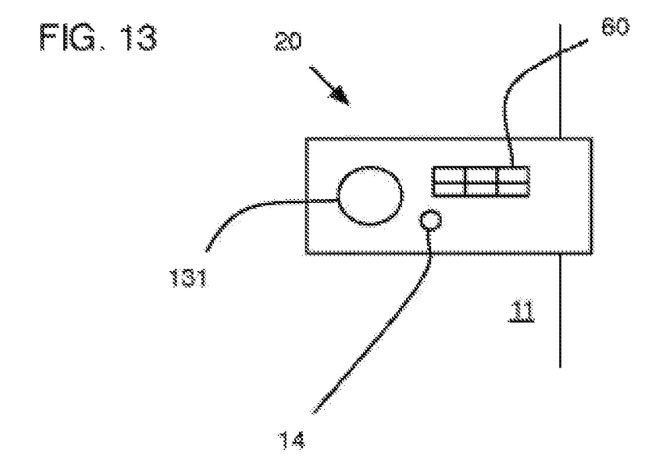
FIG. 13 is a back view of FIG. 12 and shows the second camera.

Making general reference to FIGS. 11-13, the first camera 63 first camera 130 faces outward and includes a display, such as an LED display array 5 that consists of at least one light having a first and preferably a second color. Alternately Alternatively, a series of LED indicator lights (e.g. LED indicator lights 52, 54, and 56 as shown in FIG. 2) can be used to show different status conditions, such as occupied or available, and that the gesture is being interpreted or misinterpreted by the processor (i.e. a flashing green indicates that the gesture is correct, but a flashing red light indicates that the gesture is not being understood).

Figure 5:
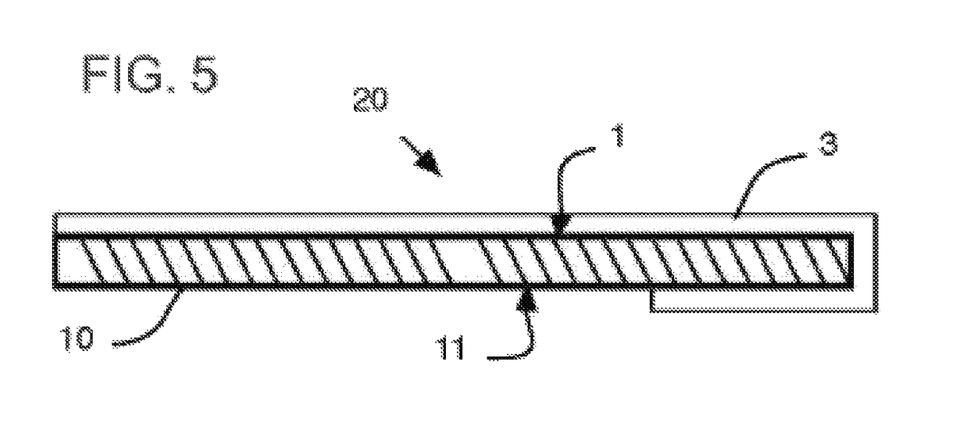
FIG. 5 is a top view of the embodiment of FIG. 4.
Figure 6:
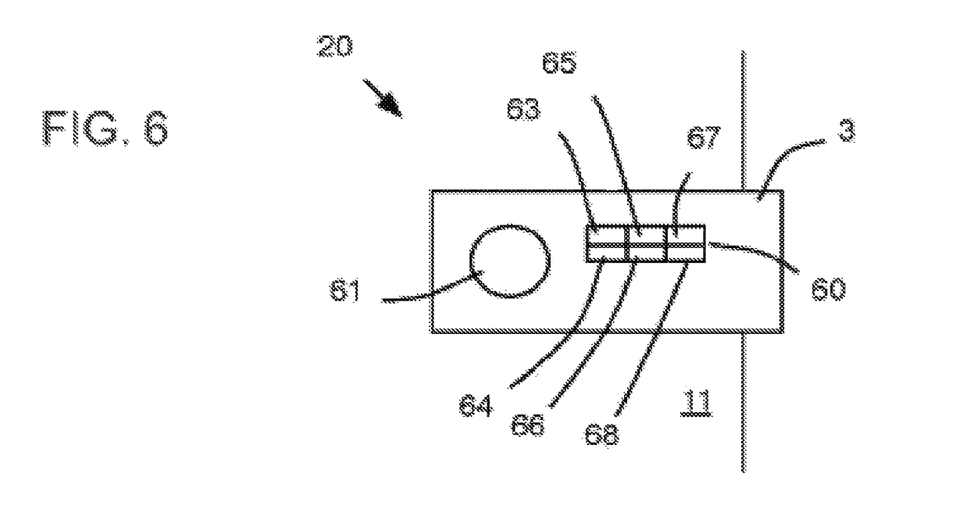
FIG. 6 is a back view of the embodiment of FIG. 4.

Both the interior portion and exterior portion of the invention 20 include a manual override handle 13, 61. On the inside of the stall, the shell 3 includes a handle 13 (FIG. 5) that mechanically connects to the lock pin and slides back and forth horizontally as the lock pin actuates from unlocked to locked and back. The handle is sufficiently large to allow a patron to grab hold and slide the lock in the direction desired and pull or push the door to the desired open or closed position. On the exterior face, a handle 61 (FIG. 6) includes a key lock to isolate the handle from movement to prevent unwanted operation of the lock mechanism. However, in emergency or other situations, the restroom management can insert a key to enable exterior manual opening/closing and/or locking/unlocking of the enclosed area door.

Also included on the interior portion of the shell 3, an occupied sensor 14 determines whether the enclosed area is occupied by a patron. If so, a signal is sent to the controller causing the exterior LED to illuminate an occupied sequence (i.e. three red lights, or illuminating a back-lit text stating "occupied," or other known means of communicating that the enclosed area is in use by a patron). Conversely, the same sensor 14, detecting that the enclosed area is unoccupied, signals the controller to display a "vacant" signal to the exterior display 60.

As shown in FIG. 13, there is also an inward facing camera 131, its operation and configuration is very similar to the outward facing camera 131 and the inside portion of the door may also include one or more indicator lights (shown as LED indicator 60), as previously explained.

Not shown in the drawing, however, as would be well-understood by those in this art, the conventional lock mechanism for enclosed area doors typically comprises a simple bolt pin that slides or extends horizontally from an open position to a closed position. In the closed position, a cooperating mechanical fixture mounted to the stationary wall-portion of the enclosed area receives a portion of the bolt pin, which prevents the door from swinging open. This is a very simple and affective design. The present invention includes an electromagnet that, when charged, magnetically couples to the traditional lock pin, or a pin that is substantially similar in operation. So energized, the controller can then signal an actuator to move from a first position to a second position and thereby draw, by the magnetic coupling, the pin open. Simple mechanical transfer of motion is used to push the pin into the locked position.

Figure 7:
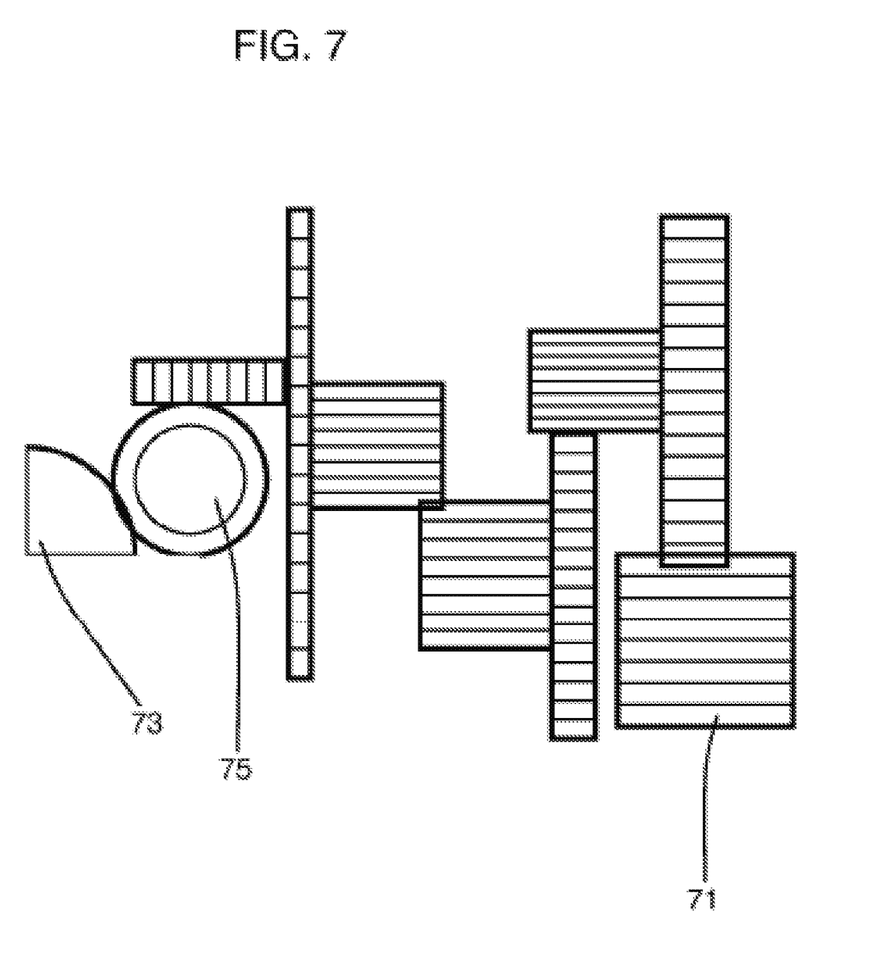
FIG. 7 is a partial view of section 7-7 of FIG. 1.

Because enclosed area doors are relatively light-weight (compared to conventional doors), a simple opening mechanism and low-power motor is all that is needed to open the door. A simple DC motor coupled to a gear set (see FIG. 7) enables forward or reverse rotation of the motor spindle gear 271. This rotary motion is distributed through a gear-set to the door opening gear 275, which meshes with a similar gear on the door 273. To reduce the relative high-speed rotation of the motor at gear 271, a series of reduction gears transfers the vertical-axis rotation to horizontal axis rotation and simultaneously reduces the speed to open and close the enclosed area door coupled to gear 273 (not shown in the drawings). A clutch (not shown) enables a manual override of the door opening an closing with out engaging and damaging the motor.

In addition, the present invention contemplates a stand-alone locking mechanism for retrofitting to existing power-actuated doors 10. It will be appreciated and understood by those skilled in this art that the invention described herein can be adapted for use on any such door where "hands-free" opening of the door and locking/unlocking of the door is desired. To avoid unwanted locking, unlocking, or opening of a door, a particular gesture is pre-programmed and predetermined. Any gesture is possible, however, care must be taken to avoid gestures that might appear to the camera similar to linear movement from, for example, someone simply walking past the camera or proximity sensor. Thus, a wave or circular hand motion may be desired to be incorporated in the predetermined gesture. The predetermined gestures can be represented on an instruction panel displayed on the door, for example.

Accordingly, the improved apparatus 20 for automatically opening, closing, locking, and unlocking a swinging door 10 includes a first actuator and power-assisted drive mechanism for opening and closing the door and a second actuator and associated power-assisted drive mechanism for locking and unlocking the door, a control unit, a power source (either on-board or remote) and a plurality of sensor units (e.g. sensors 14, 51, 53, 55, 63, 65, and 67). It is further contemplated that the mechanism for opening the door and the mechanism for locking the door could be combined into one mechanism. In one embodiment these are separate mechanisms, and both power drive mechanisms include a corresponding limit unit in communication with the mechanical components for opening and locking the enclosed area door so that manual operation can be affected without damage to the automatic components.

To operate the improved apparatus for automatically opening, closing, locking, and unlocking a swinging door 10 in a hands-free mode, first, an interior sensor 14 must sense that the enclosed area is unoccupied (a second condition). The apparatus indicates an unoccupied status by illuminating an LED indicator 60 (which may include individual LED indicators labeled as 64, 66, and 68 in FIG. 6) on the exterior 11 of the door 10. Then, the patron places a hand in front of the left-most proximity first camera 63 first camera 130 on the exterior side of the door and then moves the hand in a predetermined pattern or gesture. The first camera 63 first camera 130 (FIG. 11) reads this pattern, which is in communication with a processor that then interprets the series of images streamed from the first camera 130. If the gesture made by the user matches the predetermined pattern, an indicator light will glow solid green. The processor then commands the door-opening/closing drive mechanism to open the door.

Once the patron is inside the enclosure accessed by the door 10, a second proximity sensor or camera 131 (FIG. 13) captures the gesture made by the user. Again, a predetermined pattern read by the second proximity sensor or camera 131 by means of the processor, signals actuators that close the door. With the door closed and the enclosure occupied, an indicator 60 on the exterior 11 of the door 10 indicates that the enclosure is occupied, for example by displaying a solid red color or a sign that illuminates or otherwise indicates "occupied." A corresponding indicator 5 on the inside 1 of the enclosure also illuminates to show the user what the status indicator on the outside shows.

To unlock and exit the enclosure, the patron waves the hand in a predetermined gesture pattern, which is read by the proximity sensor or camera 131 (FIG. 13) and processed by the processor and the door 10 unlocks and opens.

To assist operation with seeing-impaired patrons, an audible signal may be used to augment the illuminated LED indicators 5, 60 and to indicate registration of the swiping hand movement in front of the respective sequence of proximity sensors (e.g. sensors 51, 53, 55, 63, 65, and 67). The controller can be programmable to vary options of opening, closing, locking, and unlocking. For example, the controller can be programmed to ignore commands to lock the enclosed area door 10, or can be programmed to automatically lock the door upon receiving a "close door" sequence from the interior proximity sensors. Similarly, to unlock the door, the controller can be programmed to require a first and second swipe past the proximity sensors. The direction and duration of the swipe may be programmed as required to enable full customization of the apparatus.

In one preferred embodiment, a low-power apparatus is contemplated wherein on-board storage cells (batteries) draw current from ambient light from a solar panel on the door or connected to the apparatus. The batteries provide sufficient power to run the two actuators for opening/closing and locking/unlocking. In this manner, the apparatus is a self-contained unit that can be retrofitted to existing enclosed area doors that use simple hinges (lacking any opening mechanism) and gravity to operate.

For example, a conventional rest-room enclosed area door 10 is relatively light-weight and is attached to the adjoining stall-wall by a top and bottom hinge element. The weight of the door does not require a supplemental mechanism to assist with opening or closing. The existing enclosed area door is simply pulled or pushed open or closed. The present invention readily adapts to the conventional enclosed area door and comprises an outer housing with a rigid shell and a variable shell adapted to fit varying widths of enclosed area doors. There is an exterior side and an interior side of the housing 3 corresponding to the orientation of the apparatus on an enclosed area door 10. This housing consists of a lightweight metal (such as aluminum or stainless steel) or a tough plastic material (such as ABS) or other similar material common to commercial rest-room construction as would be well-understood in this art. The housing protects the various components from vandalism and unintentional damage from use in high-volume public restrooms.

A preferred embodiment of the present invention includes a hands-free operation module for the enclosed area door, of which a portion is mounted on the interior face of the door. This interior portion of the module includes a housing, at least a portion of which is a rigid shell segment or a plurality of overlapping segments to accommodate varying widths of enclosed area doors.

The exterior face of the bathroom stall doors includes a shell covering at least a portion of the exterior. The portion being sufficient to present a sensor and display to patrons.

A portion of the interior face of the enclosed area door includes a shell housing having a display and sensor array. The housing further covers and holds therein a controller (or preferably a processor) with power supply. This processor and power supply, naturally, can be two separate units, such as a solid-state logic board and separate battery pack coupled by electrical wires for transferring power to the board and further in electrical communication with the various components as would be understood by those skilled in this art.

The first proximity sensor faces outward and includes a display, such as an LED display array that consists of at least one light having a first and preferably a second color. Alternately, a series of LED indicator lights can be used to show different status conditions, such as occupied, available, and that the gesture is being interpreted or misinterpreted by the processor (i.e. a flashing green indicates that the gesture is correct, but a flashing red light indicates that the gesture is not being understood).

Both the interior portion and exterior portion of the invention include a manual override handle. On the inside of the stall, the shell includes a handle that mechanically connects to the lock pin and slides back and forth horizontally as the lock pin actuates from unlocked to locked and back. The handle is sufficiently large to allow a patron to grab hold and slide the lock in the direction desired and pull or push the door to the desired open or closed position. On the exterior face, a handle includes a key lock to isolate the handle from movement to prevent unwanted operation of the lock mechanism. However, in emergency or other situations, the restroom management can insert a key to enable exterior manual opening/closing/locking/unlocking of the enclosed area door.

Also included on the interior portion of the shell, an occupied-sensor determines whether the enclosed area is occupied by a patron. If so, a signal is sent to the controller causing the exterior LED to illuminate an occupied sequence (i.e. three red lights, or illuminating a back-lit text stating "occupied," or other known means of communicating that the enclosed area is in use by a patron). Conversely, the same sensor, detecting that the enclosed area is unoccupied, signals the controller to display a "vacant" signal to the exterior display.

There is also an inward facing proximity sensor or other sensor, its operation and configuration being very similar to those of the outward facing proximity sensor. The inside portion of the door may also include one or more indicator lights, as previously explained.

Not shown in the drawing, however, as would be well-understood by those in this art, the conventional lock mechanism for enclosed area doors typically comprises a simple bolt pin that slides or extends horizontally from an open position to a closed position. In the closed position, a cooperating mechanical fixture mounted to the stationary wall-portion of the enclosed area receives a portion of the bolt pin, which prevents the door from swinging open. This is a very simple and effective design. The present invention includes an electromagnet that, when charged, magnetically couples to the traditional lock pin, or a pin that is substantially similar in operation. So energized, the controller can then signal an actuator to move from a first position to a second position and thereby draw, by the magnetic coupling, the pin open. Simple mechanical transfer of motion is used to push the pin into the locked position.

Because enclosed area doors are relatively light-weight (compared to conventional doors), a simple opening mechanism and low-power motor is all that is needed to open the door. A simple DC motor coupled to a gear set enables forward or reverse rotation of the motor spindle gear. This rotary motion is distributed through a gear-set to the door-opening gear, which meshes with a similar gear on the door. To reduce the relative high-speed rotation of the motor at gear, a series of reduction gears disposed intermediate transfers the vertical-axis rotation to horizontal axis rotation and simultaneously reduces the speed to open and close the enclosed area door coupled to gear.

Other embodiments of the door-opening system include stand-alone devices or accessories working with the aforementioned automated door opener for various public restroom stall door latch and locking devices. Such a standalone or accessory unit covers the locking mechanism and carries its own power supply and sensor array to unlock the stall door. Common locks include a rotary style, or a sliding latch, or a lock integrated into the door handle. This latter-type of lock prevents the latch bolt from retracting and the handle/lever from rotating when in the locked position. Often this type of lock mechanism has a pushbutton that activates the lock mechanism. The present invention, in one embodiment, contemplates a device that overlays a portion of the handle and rose and replaces the push button with an automated door locking system that mechanically interfaces with the latch bolt and is activated by motion sensing proximity sensors as described above.

Latch Mechanism.

As described herein, when an open condition is detected, the motor assembly opens the door. This opening consists of activating a DC motor to turn, which in turn drives transmission gears that transfer this rotation to a rod assembly 290 (FIG. 19), moving the entire rod assembly 290, which at a distal end couples to an arm and pivot 292 that couples to the door.

Figure 19:
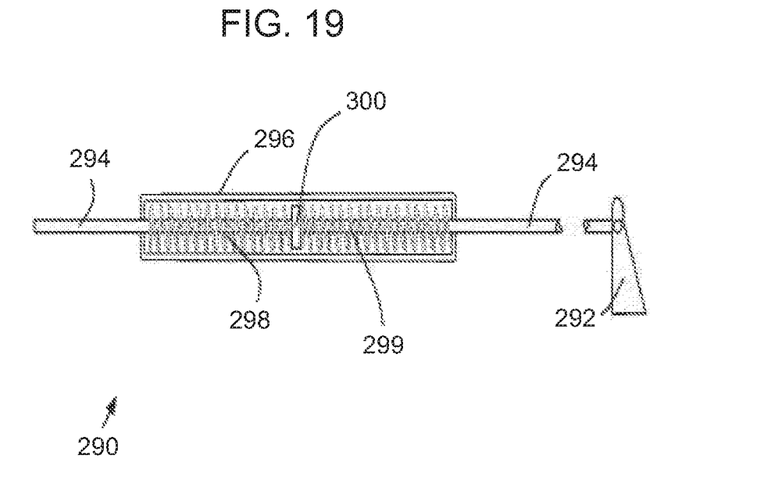
FIG. 19 is a top view of a rod assembly component of one embodiment of the present invention.

To enable manual operation of the door without damaging the motor, transmission, and gears, the rod assembly 290 consists of an inner rod 294, outer tube 296, and compression springs 298, 299. If the door is manually operated, the inner rod 294 moves relative to the outer tube 296 compressing one of two compression springs (depending on the direction door is being manually operated). When manual pressure is removed from the door, the compression spring 298, 299 rebounds, thus driving the inner rod 294 back to its original position.

As shown, a stop 300 couples to the inner rod 294 and is disposed at an intermediate location on the inner rod 294 with respect to the other tube 296. A first compression spring 298 rests on one side of the stop 300 and second compression spring 299 is arranged on the opposite side of the stop 300. The stop 300 and both compression springs 298, 299 are encapsulated by the outer tube 296. The outer tube 296 allows the inner rod to slidably move, but the opposite ends of the outer tube are partially closed to prevent the compression springs from escaping.

Improved Hinge Mechanism.

The present invention relates to an improved hinge mechanism device that enables a "hands-free" automated door opening system as described in U.S. Pat. No. 8,284,018 to operate more easily, and to use less power, and yet still allow manual opening of a bathroom stall door, for example.

The entire disclosure of U.S. Pat. No. 8,284,018 is hereby incorporated by reference as if fully set out herein.

One limitation of an automated bathroom stall door as described in U.S. Pat. No. 8,284,018 is the ability of the automated system to allow manual operation of the door without damaging the automated mechanism. The present invention, accordingly, improves upon the automated system by incorporating a novel arrangement of unique off-set hinge mechanisms that work in concert with this automated door opening system, as detailed below. Moreover, the present invention is well suited for use with portable bathrooms, or conventional bathroom stalls as used in public restrooms in, for example, schools, shopping malls, locker rooms, hospitals, etc.

The present invention includes three off-set hinges adapted and configured to work in harmony to utilize the weight of the door to cause the door to self position (i.e. self close), and further allow manual over-ride operation of the door (i.e. a patron pushing open or pulling closed the door) without damaging the automated components (the automated components are further described, below). Adding or replacing the conventional center-mount pivot-hinge found in most conventional bathroom stall door scenarios, and replacing any piano mount hinges in other conventional bathroom stall door applications, the present invention utilizes three offset hinges, each with a unique configuration. The three hinges are referred to as the top hinge 10, center hinge 12 and bottom hinge 14, and are further detailed in the following paragraphs.

Figure 14:
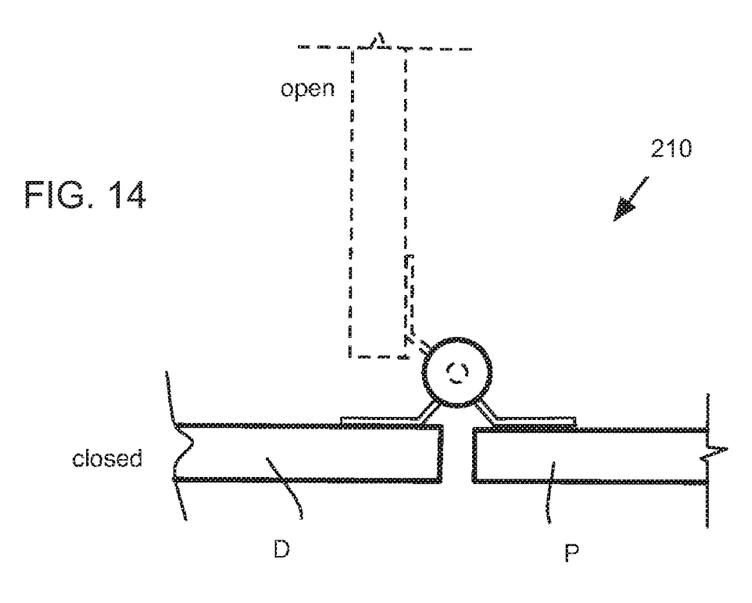
FIG. 14 is a partial top view of a top hinge according to one preferred embodiment of the present invention.
Figure 16:
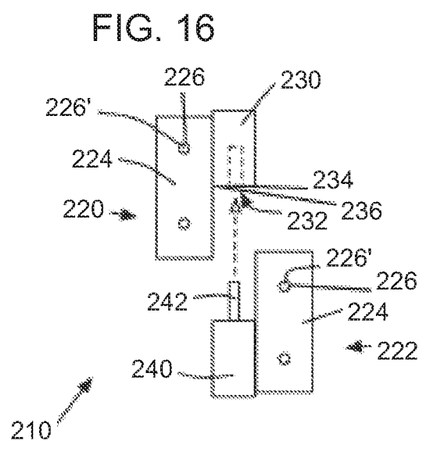
FIG. 16 is a front view of the top hinge of FIG. 14.

Top And Bottom Hinges:

Both the top 210 and bottom 214 hinges operate and are otherwise configured similarly. Making specific reference to the top hinge: The top hinge consists of a door-side leaf 220 and a panel-side leaf 222. Each leaf includes a relatively flat, rectangular body 224 area with two or more through holes 226 traveling through the body. The through holes 226 are configured to receive common fasteners 226'. The common fasteners couple the corresponding leaf to the structure of the door D or fixed panel P, as appropriate.

The door-side leaf 220 further includes an upper shoulder 230 portion that defines a cylindrical slot 232 with a circular opening 234 on a bottom face 236 of the shoulder portion. The opening 234 and the slot 232 are configured to slidably receive a pin 242 from the panel-side leaf 222.

The panel-side leaf 222 includes a corresponding lower shoulder portion 240 carrying an upward extending cylindrical pin 242, which is configured to insert into the cylindrical slot 232 of the upper shoulder 230.

Figure 17:
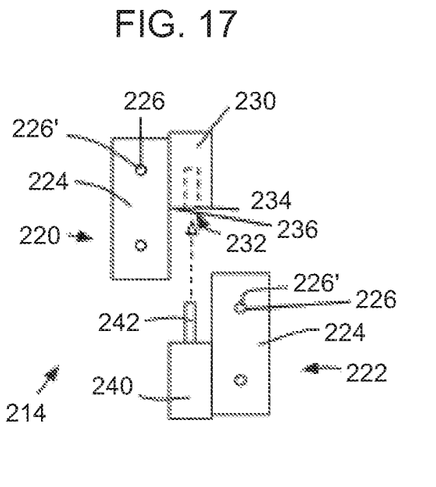
FIG. 17 is a front view of a bottom hinge according to one preferred embodiment of the present invention.

The bottom hinge 214 is configured identically to the top hinge; a detailed recitation of the bottom hinge is omitted for brevity. However, those skilled in the art will appreciate its form, function, configuration, and operation are identical to that of the upper hinge just described above.

Figure 15:
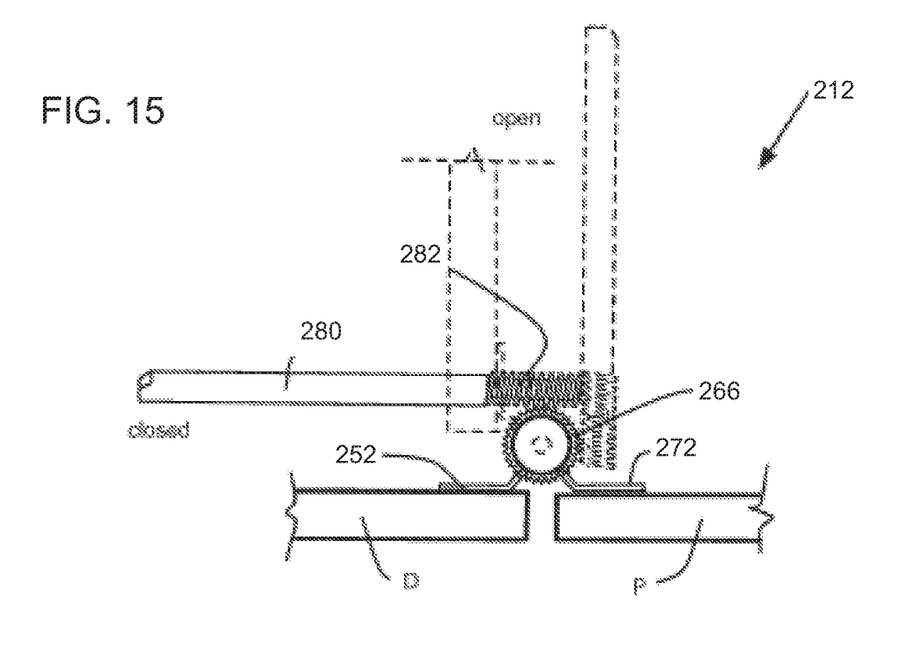
FIG. 15 is a partial top view of a center hinge according to one preferred embodiment of the present invention.
Figure 18:
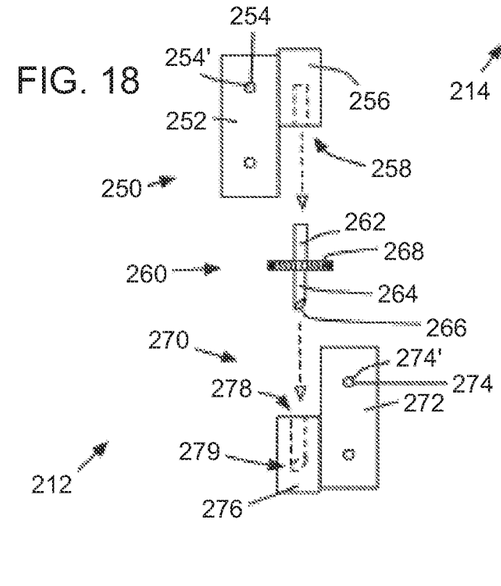
FIG. 18 is an exploded assembly view of the center hinge of FIG. 15.

Center Hinge:

The center hinge 212 consists of three primary components: a top leaf 250, a center pin 260, and a bottom leaf 270.

The top leaf 250 includes a substantially flat and rectilinear leaf body 252 having two or more through holes 254, which are configured to enable conventional fasteners 254' to attach the top leaf to the door D. The top leaf further includes a top socket 256 that defines an inverted cylindrical slot 258 with a circular opening on a bottom surface of the top socket.

The bottom leaf 270 includes a substantially flat and rectilinear leaf body 272 having two or more through holes 274, which are configured to enable conventional fasteners 274' to attach the bottom leaf to the fixed panel P. The bottom leaf further includes a bottom socket 276 that defines an upright cylindrical slot 278 with a circular opening on a top surface of the bottom socket. This upright cylindrical slot further includes a specifically oriented beveled bottom wall 279.

The center pin 260 is configured to include an upper pin-portion 262 adapted to slidably insert into the inverted cylindrical slot 278 of the top socket 276 and an oppositely disposed lower pin-portion 264 adapted to slidably insert into the upright cylindrical slot 278 of the bottom socket 276. A gear 266 is disposed intermediate to the upper pin-portion and lower pin-portion. The gear is fixed or otherwise coupled to the pin whereby rotation of the gear results in corresponding rotation of the pin including both the top portion and bottom portion.

The lower pin-portion further includes a beveled lower (distal) end 268: This bevel 268 matches the bevel 279 of the bottom socket's upright cylindrical slot's bottom wall.

The upper pin-portion 262 is coupled to the inverted cylindrical slot 258 so that as the pin rotates the pin causes the door to rotate in a corresponding manner. And conversely, if the door rotates, the door causes the center pin to make a corresponding rotation. However, the lower pin-portion 264 is further configured to rotate freely in the bottom leaf 270.

In automated operation, the motor of the automated door (see below), through gears, transfers power to the pin gear, thus causing the center pin to rotate (open or closed as determined by the automated door motor assembly). The design of the cooperating bevels (lower socket and center pin) causes the pin to normally rest with the matching bevels in contact. So, when the motor engages the pin gear, the door moves from a first position (i.e. closed) to a second position (i.e. open), or vice versa. At a proximal end, the rod 280 includes a worm gear 282 that is configured to engage the gear 266 of the center hinge 260. The worm gear 282 is able to disengage from the gear 266 when the door is manually manipulated.

In manual operation, however, when a patron pushes open or pulls closed the door, the center pin, free to rotate on the bottom socket, twists, and therefore, rises upward out of the bevel portion of the bottom socket. The rigid coupling of the center pin's upper pin-portion to the top socket forces the entire door upward. As the top and bottom hinges include free-sliding pins, the entire door is free to move upward and thus remove the center gear from the transmission gear of the motor assembly, thus preventing stripped gears.

Further, the weighting of the door combined with the cooperating three hinges as just described, causes the door to return to the first (closed) position after a patron manually pushes (from inside the stall) or pulls (from outside the stall) the door open (second position).

Additional Components.

To further enable hands-free operation of bathroom stall doors and portable bathroom doors, a foot pull device mounts to a lower portion of the door at an end opposite the hinged edge of the door. The foot pull includes an L-shaped or U-shaped extension that configures to enable a user to push open or pull closed the door with the user's foot.

Another aspect of the present invention is the use of a latch handle that operates by means of a solenoid when a condition is such to indicate that the door should be latched or unlatched, but can also be over-ridden manually enabling the user of the bathroom to simply unlatch the door in a conventional manner.

Yet another aspect of the contemplated invention is a sensor panel that couples (by gluing or screwing, for example) to the door and pulls power (either by wire or induction) from an existing power supply, such as the automated door actuator present on most power handicap bathroom doors.

Although the invention has been particularly shown and described with reference to certain embodiments, it will be understood by those skilled in the art that various changes in form and detail may be made without departing from the spirit and scope of the invention.

What is claimed is:

1. An improved apparatus for opening and closing a door, the improved apparatus comprising:
    (a) a first sensor and a first display on a first side of the door, the first display for indicating a condition or status selected from the group consisting of:
        (i) an area associated with the door is occupied; and
        (ii) an area associated with the door is available;
    (b) a second sensor and a second display on a second side of the door, the second display for indicating a condition or status selected from the group consisting of:
        (i) the door is locked;
        (ii) the door is unlocked;
    (c) a processor:
        (i) the processor being in communication with the first sensor, the processor adapted to receive a first data signal from the first sensor;
        (ii) the processor being in communication with the second sensor, the processor further adapted to receive a second data signal from the second sensor; and
        (iii) the processor further comprises a gesture-recognition or movement pattern-recognition module adapted to read the first and second data signals to determine whether the first data signal or the second data signal is at least one predetermined gesture or movement pattern;
    (d) a first actuator in communication with the processor, the first actuator adapted to open the door when activated by the processor when the gesture-recognition or movement pattern-recognition module determines the gesture or movement pattern captured by the first or second sensor is at least one first predetermined gesture or movement pattern; and
    (e) a second actuator in communication with the processor, the second actuator adapted to lock the door when activated by the processor when the gesture-recognition or movement pattern-recognition module determines the gesture or movement pattern captured by the first or second sensor is at least one second predetermined gesture or movement pattern, the second actuator adapted to unlock the door when activated by the processor when the gesture-recognition or movement pattern-recognition module determines the gesture or movement pattern captured by the second sensor is at least one third predetermined gesture or movement pattern.

2. An improved apparatus for opening and closing a door, the improved apparatus comprising:
    (a) a first sensor and a first display on a first side of the door, the first display for indicating a condition or status, the condition or status selected from the group consisting of:
        (i) an area associated with the door is occupied; and
        (ii) an area associated with the door is available;
    (b) a second sensor on a second side of the door;
    (c) a processor:
        (i) the processor being in communication with the first sensor, the processor adapted to receive a first data signal from the first sensor;
        (ii) the processor being in communication with the second sensor, the processor further adapted to receive a second data signal from the second sensor; and
        (iii) the processor further comprises a gesture-recognition or movement pattern-recognition module adapted to read the first and second data signals to determine whether the first data signal or the second data signal is at least one predetermined gesture or movement pattern;
    (d) a first actuator in communication with the processor, the first actuator adapted to open the door when activated by the processor when the gesture-recognition or movement pattern-recognition module determines the gesture or movement pattern captured by the first or second sensor is at least one first predetermined gesture or movement pattern; and
    (e) a second actuator in communication with the processor, the second actuator adapted to lock the door when activated by the processor when the gesture-recognition or movement pattern-recognition module determines the gesture or movement pattern captured by the first or second sensor is at least one second predetermined gesture or movement pattern, the second actuator adapted to unlock the door when activated by the processor when the gesture-recognition or movement pattern-recognition module determines the gesture or movement pattern captured by the second sensor is at least one third predetermined gesture or movement pattern.

3. The improved apparatus for opening and closing a door of claim 1, the first display for indicating an additional condition or status is selected from the group consisting of:
    (a) the door is locked;
    (b) the door is unlocked;
    (c) the gesture or movement pattern is being interpreted by the processor; and
    (d) the gesture or movement pattern is being misinterpreted by the processor.

4. The improved apparatus for opening and closing a door of claim 2, the first display for indicating an additional condition or status selected from the group consisting of:
    (a) the door is locked;
    (b) the door is unlocked;
    (c) the gesture or movement pattern is being interpreted by the processor; and
    (d) the gesture or movement pattern is being misinterpreted by the processor.

5. An improved apparatus for opening and closing a door, the improved apparatus comprising:
    (a) a first sensor and a first display on a first side of the door, the first display for indicating a condition or status, the condition or status being either an area associated with the door is occupied or an area associated with the door is available;
    (b) a second sensor and a second display on a second side of the door, the second display for indicating a condition or status, the condition or status being either the door is locked or the door is unlocked;
    (c) a processor:
        (i) the processor being in communication with the first sensor, the processor adapted to receive a first data signal from the first sensor;

(ii) the processor being in communication with the second sensor, the processor further adapted to receive a second data signal from the second sensor; and (iii) the processor further comprises a gesture-recognition or movement pattern-recognition module adapted to read the first and second data signals to determine whether the first data signal or the second data signal is at least one predetermined gesture or movement pattern;

(d) a first actuator in communication with the processor, the first actuator adapted to open the door when activated by the processor when the gesture-recognition or movement pattern-recognition module determines the gesture or movement pattern captured by the first or second sensor is at least one first predetermined gesture or movement pattern; and (e) a second actuator in communication with the processor, the second actuator adapted to lock the door when activated by the processor when the gesture-recognition or movement pattern-recognition module determines the gesture or movement pattern captured by the first or second sensor is at least one second predetermined gesture or movement pattern, the second actuator adapted to unlock the door when activated by the processor when the gesture-recognition or movement pattern-recognition module determines the gesture or movement pattern captured by the second sensor is at least one third predetermined gesture or movement pattern.

6. The improved apparatus for opening and closing a door of claim 5, the first display for indicating an additional condition or status selected from the group consisting of:
(a) the door is locked;
(b) the door is unlocked;
(c) the gesture or movement pattern is being interpreted by the processor; and
(d) the gesture or movement pattern is being misinterpreted by the processor.

7. The improved apparatus for opening and closing a door of claim 1, the second display for indicating an additional condition or status selected from the group consisting of:
(a) an area associated with the door is occupied;
(b) an area associated with the door is available;
(c) the gesture or movement pattern is being interpreted by the processor; and
(d) the gesture or movement pattern is being misinterpreted by the processor.

8. The improved apparatus for opening and closing a door of claim 1, the first display for indicating an additional condition or status selected from the group consisting of:
(a) the gesture or movement pattern is being interpreted by the processor; and
(b) the gesture or movement pattern is being misinterpreted by the processor.

9. The improved apparatus for opening and closing a door of claim 1, the second display for indicating an additional condition or status selected from the group consisting of:
(a) the gesture or movement pattern is being interpreted by the processor; and
(b) the gesture or movement pattern is being misinterpreted by the processor.

10. The improved apparatus for opening and closing a door of claim 1 further comprising:
(a) the first display for indicating an additional condition or status selected from the group consisting of:
(i) the gesture or movement pattern is being interpreted by the processor; and
(ii) the gesture or movement pattern is being misinterpreted by the processor; and
(b) the second display for indicating an additional condition or status selected from the group consisting of:
(i) the gesture or movement pattern is being interpreted by the processor; and
(ii) the gesture or movement pattern is being misinterpreted by the processor.

11. The improved apparatus for opening and closing a door of claim 2, the first display for indicating an additional condition or status selected from the group consisting of:
(a) the gesture or movement pattern is being interpreted by the processor; and
(b) the gesture or movement pattern is being misinterpreted by the processor.

12. The improved apparatus for opening and closing a door of claim 5, the first display for indicating an additional condition or status being either the gesture or movement pattern is being interpreted by the processor or the gesture or movement pattern is being misinterpreted by the processor.

13. The improved apparatus for opening and closing a door of claim 5, the second display for indicating an additional condition or status being either the gesture or movement pattern is being interpreted by the processor or the gesture or movement pattern is being misinterpreted by the processor.

* * * * *